June 23, 1936.  W. MAHLER  2,045,481
BREAD SLICER
Filed Jan. 19, 1931  3 Sheets-Sheet 1
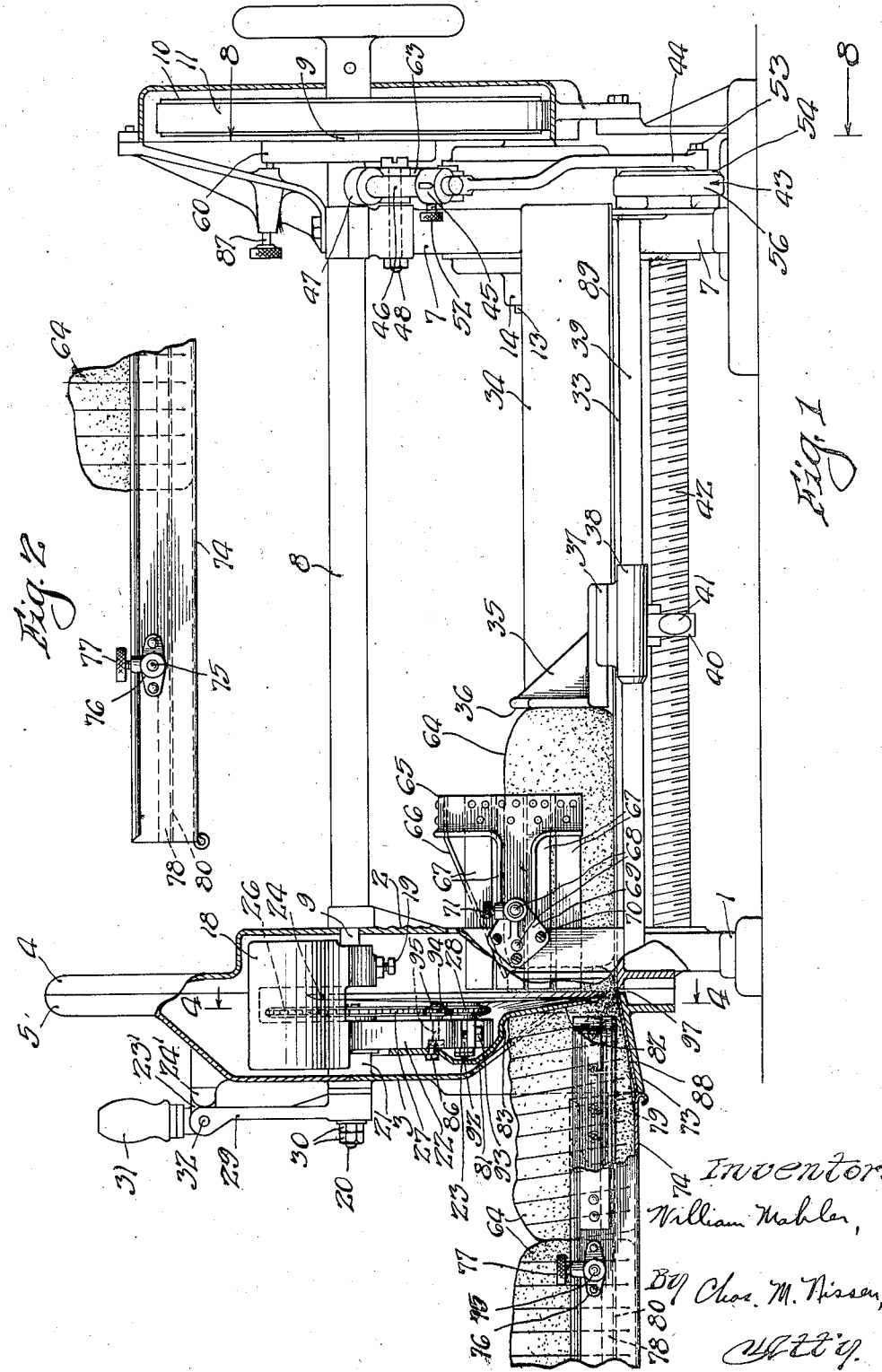
Inventor:
William Mahler,
By Chas. M. Nissen,
Att'y.

June 23, 1936.  W. MAHLER  2,045,481
BREAD SLICER
Filed Jan. 19, 1931  3 Sheets-Sheet 2
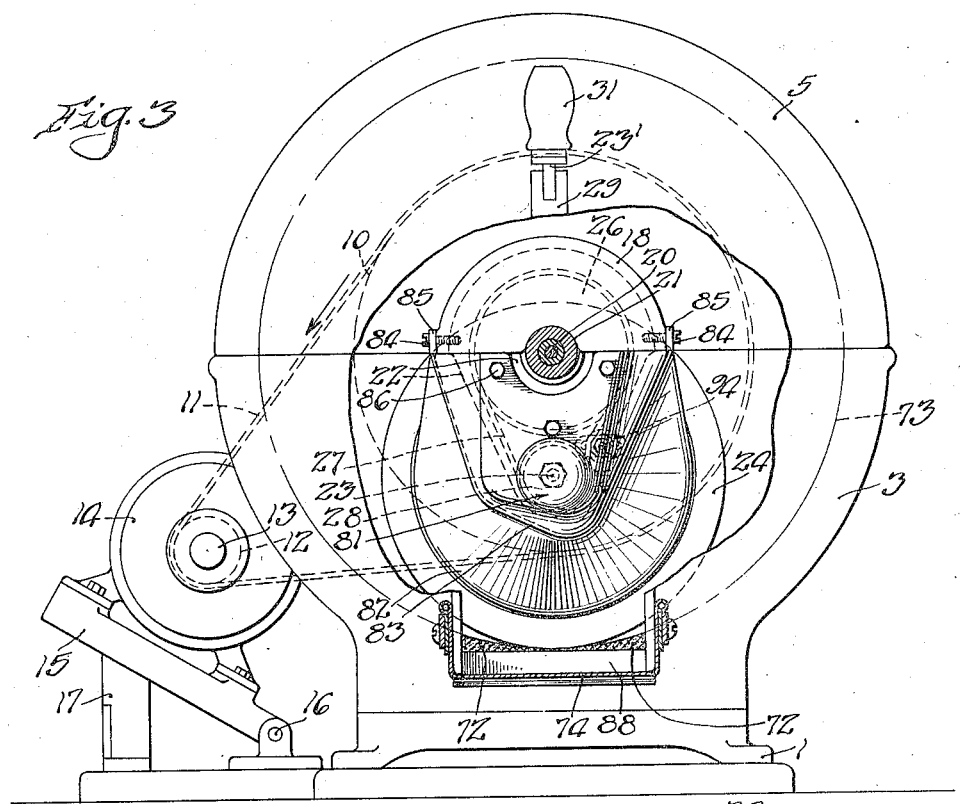
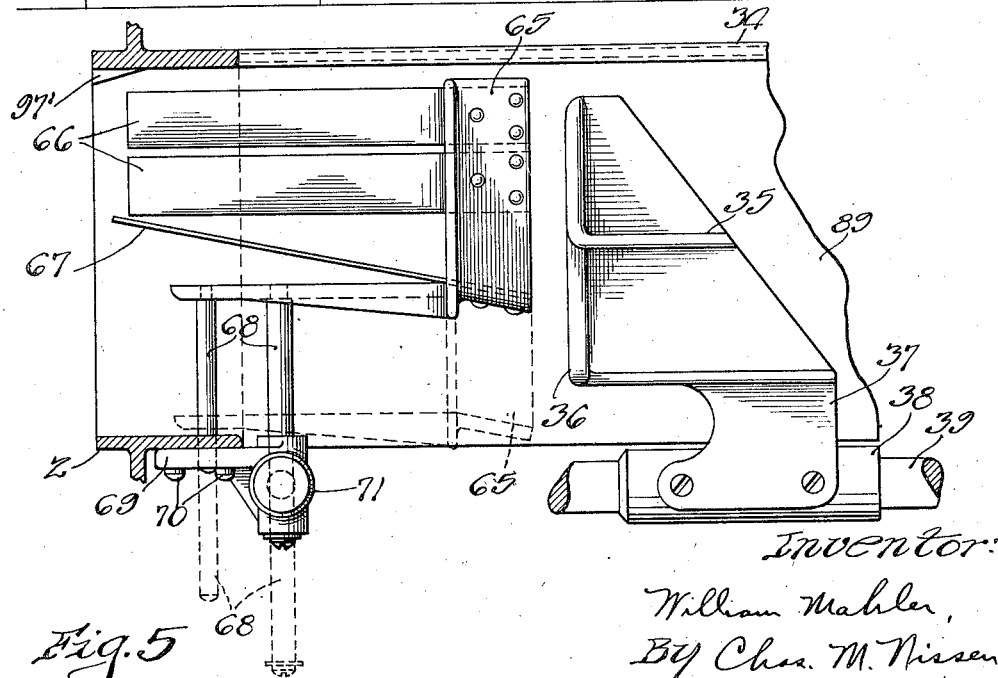
Inventor:
William Mahler,
By Chas. M. Nissen,
Atty.

June 23, 1936. W. MAHLER 2,045,481
BREAD SLICER
Filed Jan. 19, 1931 3 Sheets-Sheet 3
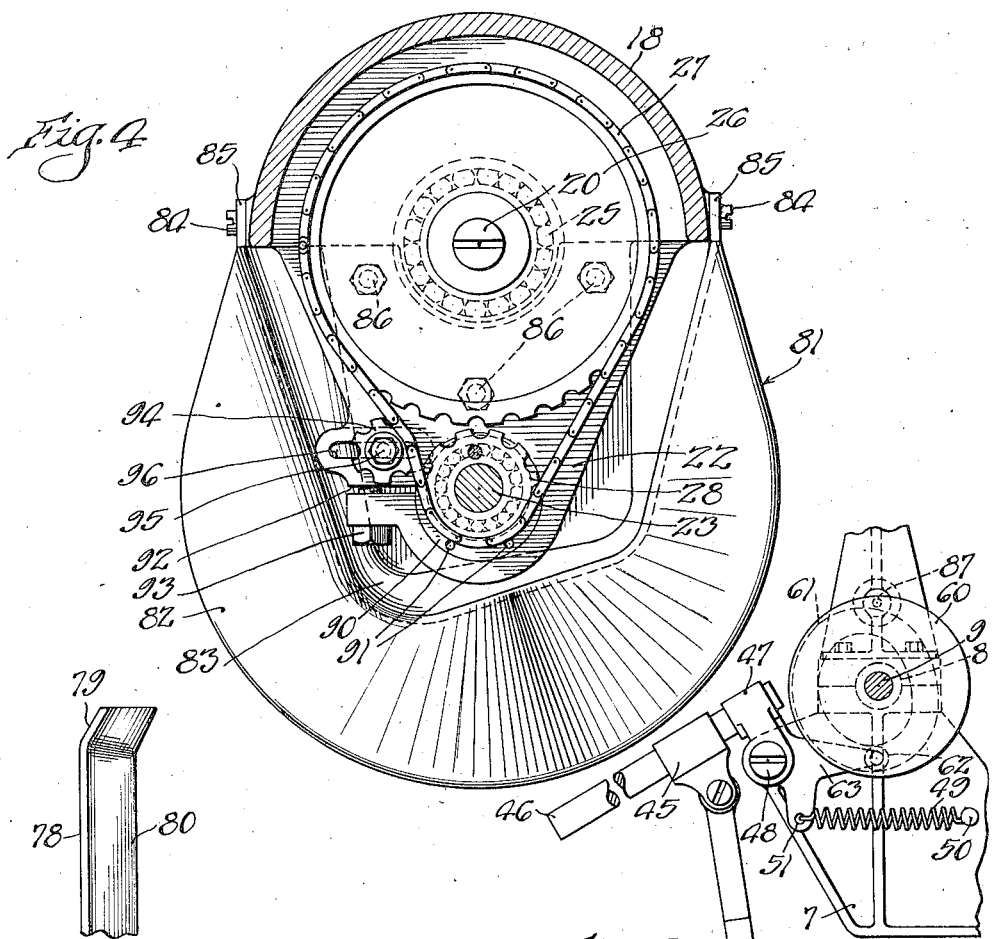
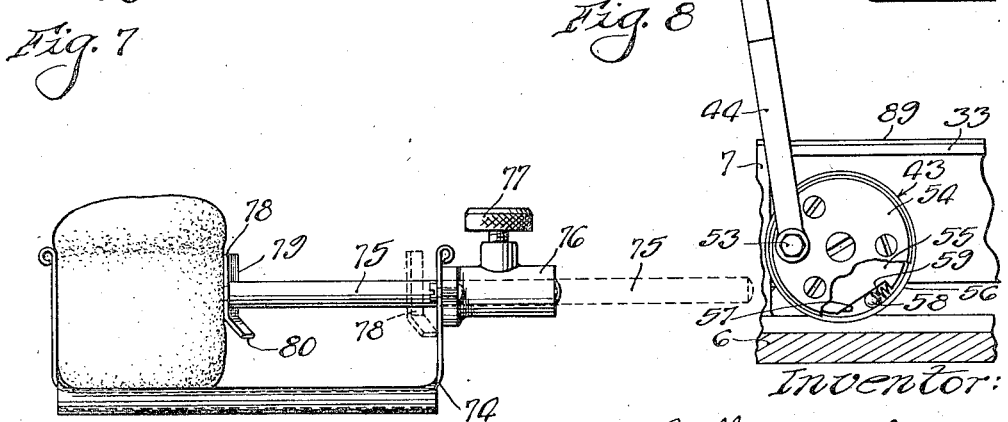
Inventor:
William Mahler,
By Chas. M. Nissen,
Atty.

Patented June 23, 1936

2,045,481

UNITED STATES PATENT OFFICE 2,045,481

BREAD SLICER

William Mahler, La Porte, Ind., assignor to U. S. Slicing Machine Company, La Porte, Ind., a corporation of Indiana Application January 19, 1931, Serial No. 509,744

5 Claims. (Cl. 146—103)

The present invention relates to the slicing of bread, and particularly to the slicing of bread prior to the sale thereof. My invention is particularly adapted to be used in the slicing of bread at bakeries before the same is placed on the market and has for its object the elimination of certain disadvantages which have been inherent in some of the known means and methods of slicing bread.

One particular object of this invention is to eliminate the necessity of using a separate container to hold the slices together after they are formed as has been necessary with prior known methods. The slices must be held with their cut surfaces together in order to prevent the drying out of the slices.

Another object of this invention is to do away with the necessity of re-assembling the slices after they have been cut, for if the slices are completely severed from each other it is necessary to stack the same by hand and place them in a container, which container holds the slices while the sliced loaf is being wrapped.

With my invention I contemplate placing a series of transverse cuts in the loaf to form slices of desired thickness, but I do not contemplate cutting entirely through the loaf. A portion of the loaf is left uncut so as to hold adjacent slices together. Preferably I cut entirely through the loaf except for a small portion of the crust on one side of the loaf, that side being preferably the bottom side of the loaf for the reason that generally the bottom side of the loaf is made in a single plane and therefore the portions which remain connecting the slices together, will be of uniform dimensions.

A very important object of this invention is the provision of a new method of slicing bread which enables the baker to wrap a loaf of bread with the slices practically severed from each other but which are held together by a sufficient portion of the bread to hold them in assembled relation while being wrapped, or after they are unwrapped by the consumer.

Other objects of this invention will appear hereinafter as the description thereof proceeds, the novel features and combinations being clearly set forth in the appended claims.

In the drawings—

Fig. 1 represents a front elevational view of a machine embodying my invention, parts of the machine being broken away for the sake of clearness;

Fig. 2 shows the extreme left hand end of the trough which supports the cut loaves after they are cut;

Fig. 3 is an end elevation of the machine with a portion of the casing which encloses the knife broken away to show the shield and some of the knife operating mechanism;

Fig. 4 is an enlarged sectional view taken substantially along the line 4—4 of Fig. 1 and illustrates the driving arrangement for the knife, the knife being omitted from this figure;

Fig. 5 is an enlarged plan view of the means for holding the bread while it is being advanced toward the knife and also a portion of the means for advancing the bread toward the knife;

Fig. 6 shows an end elevation of the trough as viewed from the left in Fig. 2;

Fig. 7 is a detail view of a part of the mechanism shown in Fig. 6; and

Fig. 8 is a section taken substantially along the line 8—8 of Fig. 1.

The means for driving the knife is substantially the same as that shown in Application Serial No. 5,681 of H. Stukart which became Patent No. 1,884,912 on October 25, 1932, and only a brief description of that driving mechanism will be given in this application as a more complete description of the driving mechanism may be had by reference to the aforementioned application.

The slicing machine comprises a bracket 1 which extends upwardly and a portion thereof shown at 2, acts as part of the casing for enclosing the knife and its mounting. A portion 3 is secured to the portion 2 and these portions 2 and 3 in connection with the upper portions 4 and 5, form substantially a complete housing for the knife so as to protect the operator when using the slicing machine or protect any one standing near the same.

A tubular casing 8 connects the portion 2 of the casing for the knife with the bracket 7, and forms a housing for a rotatable shaft 9 which is rotatable within suitable bearings in the casing 8. On one end of the shaft is a pulley 10 over which is trained a belt 11 which in turn is trained over a pulley 12 on the rotor shaft 13 of a motor 14. The motor 14 is mounted on a base 15 which is pivoted at 16 and adjustable vertically by means of the bracket 17 so as to enable one to vary the tension in the belt 11.

The other end of the shaft 9 carries a U-shaped member 18 secured to the shaft 9 by means of a set screw 19 or like fastening means. The other leg of the U-shaped member 18 is rotatably mounted on the shaft 20, which passes through the bearing 21 on the casing 3. An arm 22 formed as an extension of the left hand leg of the U-shaped member 18 as viewed in Fig. 1, carries a rotatable shaft 23 upon which is mounted the knife 24. The shaft 20 carries a sprocket 26 and a chain 27 is trained over the sprocket 26 and the sprocket 28 secured to the shaft 23.

Ball bearings 25 are interposed between the shaft 20, and the member 18 so that when the shaft 20 is held stationary the member 18 will rotate freely about the shaft. An arm 29 is keyed to the shaft 20 and is locked in place thereon by means of the lock nuts 30. A handle 31 pivoted at 32 to the end of the arm 29 has a projection 23' thereon adapted to be arranged between a pair of abutments or lugs 24' on the casing member 5 so that when the handle is in a vertical position as illustrated in Fig. 1, the arm 29 will be prevented from rotating. However, when the handle 31 is moved through substantially 90° in a counter-clockwise direction, the lug 23' will be moved out from between the lugs 24' and the arm 29 may be rotated freely.

During the slicing operation, the arm 29 is normally held in the position illustrated in Fig. 1 so that when the shaft 9 is rotated the member 18 will be carried about the shaft 20, but the sprocket 26 will remain stationary. Since the member 18 rotates and the sprocket 26 remains stationary, the chain causes a rotation of the sprocket 28, and consequently a rotation of the shaft 23, the rotation of the shaft being in a direction which is opposite to the direction of movement of the rotating arm 22, and for a purpose which will be described presently.

The bracket 7 and support 1 carry a trough which has a horizontal portion 33 and a vertical portion 34 arranged at the back of the horizontal portion 33 as viewed in Fig. 1. A feed plate 35 having a vertical abutment face 36 is connected by a member 37 to a bearing 38 slidable on the rod 39. The guide rod 39 guides the member 35 for rectilinear movement and the bearing 38 is fed with a step by step movement along the guide rod 39 by means of a feed nut 40 operated by a handle 41 which engages the threads on the feed screw 42 rotatably mounted in the brackets 1 and 7. On the end of the feed screw 42 is a free-wheel 43 which is connected by means of a link 44 to a member 45 slidable on the rod 46 and adapted to be clamped in position along the rod 46 by means of the screw 52. The rod 46 is secured within a casting 47 pivotally mounted on the bolt 48 secured to the bracket 7 and a spring 49 attached to the bracket 7 at 50 and to the casting 47 at 51 is adapted to normally rotate the casting 47 in a counter-clockwise direction. As is best illustrated in Fig. 8, the link 44 which is pivoted at 53 to the disk 54 of the free-wheel 43, is adapted to rotate the disk 55 within drum 56 as the link oscillates. The disk 54 rotates freely on the end of the feed screw 42, and the drum 56 is secured rigidly to said feed screw.

A plurality of recesses 57 are formed about the periphery of the disk 55, and in these recesses are the balls 58 spring-pressed by means of the coiled springs 59 into engagement with the inner periphery of the drum member 56 and the opposed surface of the recess 57. As the link 44 moves downwardly, the disk 55 is rotated in a counter-clockwise direction which causes the ball 58 to be wedged between the inner periphery of the drum and the opposed surface of the recesses thereby causing the drum to rotate with the disk. In view of the fact that the drum 56 is rigid with the feed screw 42, the feed screw 42 is also caused to rotate in a counter-clockwise direction as viewed in Fig. 8, whenever the link 44 moves downwardly.

As the link moves upwardly however, there is no wedging action between the spring-pressed balls 58 and the adjacent surfaces of the disk and drum, and therefore, there is no rotation of the drum and consequently no rotation of the feed screw.

In order to oscillate the casting 47 and thereby move the link 44 up and down alternately, I provide a cam 60 secured to the shaft 9 and in this cam 60 is a cam groove 61 in which a roller 62 on the end of an arm 63 of the casting 47 is adapted to travel. As the cam rotates with the shaft, there is imparted to the casting 47 a rocking movement which in turn is imparted to the link 44 and disk 55, causing an intermittent rotation of the feed screw, and consequently of the member 42, in a manner which is more fully described in Patent No. 1,557,893 to H. Stukart.

The bread 64 is placed on the horizontal supporting surface 33, and as the member 35 is advanced toward the cutting plane of the knife by means of the feed screw 42 and the feed nut 40, the bread is moved intermittently past the cutting plane of the knife. In order to hold the bread against the horizontal surface 33 and the vertical surface 34 of the feed trough, I provide a bracket 65 carrying the spring fingers 66 for engaging the upper surface of the loaf and the spring fingers 67 for engaging the vertical surface of the loaf which is away from the vertical abutment 34 of the feed trough. The bracket 65 is carried by two guide pins 68 which slide in a bracket 69 secured by rivets 70 or the like to the portion 2 of the casing for the knife. A thumb screw 71 passes through the bearing for one of the guide rods 68 and engages the guide rod to hold the same in adjusted position.

As is clearly shown in Fig. 3, the knife is adjusted to such a position that its path of movement will not permit the knife to cut entirely through the loaf of bread but a portion of the loaf will be left uncut as illustrated by the portions 72 in Fig. 3. The path of the outer cutting edge of the knife is illustrated by the dot-dash line 73. The result of this construction is that as the bread is fed past the cutting plane of the knife, the knife passes almost entirely through the bread but one crust, viz., the lower crust, remains substantially intact and holds the slices together. However, it only requires a small amount of effort to tear the slices from each other, or if desired, the housewife may cut the remaining portions by means of a knife. The loaf of bread however, is still one piece although it is provided with a plurality of transverse cuts as clearly illustrated in Fig. 1. The baker may take the loaf and wrap the same very readily and in the usual manner, it being unnecessary to provide a tray to hold the slices in assembled relation.

As the loaf of bread passes beyond the cutting plane of the knife and down the inclined supporting member 73, into the trough 74, means is provided for holding the slices in a substantially vertical position as there is some tendency for the forward slices to fall forwardly as the bread is being moved along the trough. This means is best illustrated in Figs. 1, 2 and 6 and comprises a pair of guide bars 75 slidable in the bearing brackets 76 and held in adjusted position within the bearing brackets 76 by means of the thumb screws 77, the latter passing through the bearing brackets into engagement with the rods 75. The ends of the rods 75 adjacent the loaf of bread, support the guide 78 which has a beveled portion 79 at the forward end thereof and with a lower beveled portion 80 as best illustrated in Figs. 6 and 7. The lower beveled surface 80 is particularly designed for use with such loaves of bread as have sloping surfaces adjacent the guide such as for instance rye bread. The rods 75 may be adjusted to position the guide 78 in any position within the limits of the adjustment and for the purpose of accommodating loaves of various widths. The frictional resistance offered by the guide 78 holds the slices in a vertical position and substantially prevents any movement of the slices to an undesired position. If desired the rods 75 may be spring-pressed toward the loaf or resilient means may be provided on the guide itself for compensating for any slight inequalities in the width of the loaf of bread being sliced.

As is best illustrated in Figs. 1, 3 and 4, a shield 81 is provided with a slice engaging portion 82 which comes into relatively close proximity to the cutting edge of the knife and is adapted to engage a substantial portion of the slice which is being cut and move that portion of the slice away from the knife so that the rotation of the knife is not transmitted to the slice, for if the slice is carried along by the knife, the relatively small portion of the slice which is still attached to the loaf is apt to be torn and the slice entirely severed therefrom. A substantially horizontal portion 83 on the shield is adapted to prevent upward movement of the slice so that the slices cannot move upward appreciably away from the remaining portion of the loaf. The shield is attached to the member 18 by means of the screws 84 passing through the ears 85 on the shield as best illustrated in Fig. 3. The shield 81 also acts as an enclosure for the gears which are used to drive the knife and bolts 86 assist in holding the shield connected to the arm 22 so that the shield is held in rigid relation to the arm and to the knife.

It will also be apparent that since the shield is moving in one direction and rotation of the knife is in the opposite direction, there will be a tendency for each of these tendencies to neutralize the other and the bread will not be jammed against the rear abutment 34, nor will the bread be crushed as is quite often the case with bread slicers which are not provided with a shield to neutralize the throwing effect of the knife. As is clearly illustrated in Fig. 1, the support 73 slopes downwardly so as to permit the slice to tilt after it has been cut and thereby make room for the knife and also the shield. Otherwise a jam is likely to occur and the slices are not formed perfectly.

While I have not shown the means for grinding the knife in this application, it will be understood that the top of the casing may be provided with a grinding knife as illustrated in the patent to Stukart No. 1,557,893 previously referred to, and that when the handle 31 is rotated so as to bring the lug 23' out from between the lugs 24', the arm 29 may be rotated so as to rotate the knife without rotating the member 18 or the arm 22. Of course when the knife is to be sharpened the shaft 9 is first locked in position by means of a pin 87 which engages within a suitable recess in the cam 60. As the knife is ground from time to time, the cutting edge moves farther and farther from the supporting surface of the horizontal support 33 and as a result more and more of the slice is left attached to the next adjacent slice, and this is not very desirable for in time the slices will be connected together by too much of the crust and may not be readily separated. Accordingly I desire to provide means for compensating for the wear in the knife so that the amount of crust which connects the adjacent slices will always be substantially the same.

I compensate for the wear of the knife in either of two ways; one way is to add wear plates to the supports 33 and 73, these wear plates being indicated by the reference numerals 88 and 89 in Fig. 1. I also provide a means for adjusting the distance between the axis of rotation of the knife and the axis of rotation of the shaft 9 to thereby vary the amount of the connecting portions for adjacent slices either to suit the different types of bread which are sliced, or to compensate for the wear of the knife, or to make it easier to separate the slices from each other while at the same time maintaining the slices in proper relation with respect to each other.

This mechanism is perhaps best illustrated in Fig. 4, in which there is an eccentric bearing 90 which rotatably supports the shaft 23 and by rotating the eccentric bearing 90, the center of the shaft 23 is moved closer to or farther away from the shaft 20 or the axis of the shaft 9, as may be desired, the openings 91 being provided in the eccentric bearing 90 for the purpose of receiving a special tool which is adapted to be used to rotate the eccentric bearing 90. Any other means may be provided for rotating the bearing within the arm 22. The end of the arm 22 is split at 92, and a cap screw 93 passes through the adjacent split portions so that by tightening the screw 93, the eccentric bearing 90 may be clamped in adjusted position.

Of course, whenever the position of the shaft 23 is changed, it is necessary to adjust the tension in the chain 27 and for this purpose I provide a sprocket wheel 94 mounted to rotate on a bolt 95 which passes through the slot 96 in the arm 92. By adjusting the bolt 95 longitudinally of the slot 96, the sprocket can be moved to increase or decrease the tension in the chain as desired or to maintain the same tension in the chain when the shaft 23 is moved to a different position. This adjustment of the shaft 23, of course, tends to move the edge of the knife closer to or farther away from the support 33, and as a result any wear of the knife may be compensated for by adjusting the position of the knife axis in the manner just described.

The trough for supporting the uncut bread has the rear abutment surface 34 thereof slightly inclined toward the front of the machine as indicated at 97' to better support the loaves and especially loaves such as rye bread.

It is of course readily understood that both of the adjustments to compensate for wear may be used simultaneously. For instance, the plates 88 may be used to compensate for large amounts of wear after the machine has been in operation for some time, and the fine adjustment of the knife axis may be used to compensate for wear each time the knife is sharpened or each time there is any appreciable wear in the knife.

It will be noted in Fig. 1, that I have shown a very small amount of clearance 97 between the support 73 and the support 33 and also between the wear plates 88 and 89. This clearance is not absolutely necessary for in the preferred form of my invention the knife does not come down past the supporting surfaces for the loaf of bread, but from a practical standpoint I find that it is advisable to use a small amount of clearance. In fact as is readily appreciated by an inspection of Fig. 3, the knife can have a path of movement which brings it below the supporting surface at its midposition and in that event, of course, the cut is taken substantially through the entire loaf at the center of the loaf, but the crust still connects the adjacent slices at the corners.

The abutment surface 36 on the member 35 can be moved into very close proximity to the cutting plane of the knife but the movement thereof is limited to such an extent that it cannot move into the plane of the knife and thereby cause the fouling of the knife. Successive loaves are preferably pushed through the machine one right after the other and in abutting relation as is illustrated in Fig. 1.

By using a machine such as disclosed in this application, various thicknesses of slices may be cut from the same loaf or from various loaves to suit a customer's wishes in that regard. When loaves are cut and packaged on a production basis, the customer's individual wishes cannot be satisfied.

Obviously changes may be made in the particular arrangement or construction of the parts shown in the form of the invention illustrated in the drawings without departing from the scope of this invention, and therefore I do not wish to be limited except in the manner set forth in the appended claims.

Having thus fully described an embodiment of my invention, what I desire to secure by Letters Patent of the United States is:

1. In a substance slicing machine, the combination with a rotatable arm, of a knife mounted to rotate on said arm eccentrically to the axis of rotation of said arm, and in a direction opposite to the direction of rotation of said arm, a substance support having the supporting surface thereof substantially perpendicular to a line drawn from the axis of rotation of said arm to the center line of said support, means for moving a substance along said support past the cutting plane of said knife substantially straddling equally said center line, and means including an eccentric mounted on the knife supporting arm for limiting the path of movement of said knife in such a manner that the knife does not pass entirely through the substance at the place where the cut is taken therein but leaves the substance connected only at the opposite edges of the same on the side of the substance away from the axis of rotation of said arm, said substance being connected by substantially equal portions at the opposite edges.

2. In a slicing machine, the combination of a rotatable knife support, a rotatable knife mounted eccentrically upon said support, means for operating said support and said knife for arcuate and rotative movement, adjusting means mounted on the knife support to bodily adjust the knife relative to the support to vary the arcuate path of the knife, drive means to effect rotation of the knife in any of its adjusted positions, means for presenting a substance to the knife so that slices will be formed by said knife, comprising guiding means for guiding the substance in a path such that the portions thereof which lie remote from the axis of rotation of said knife are partially outside of the arcuate path of movement of said knife as it passes the cutting plane thereof, the substance being so guided by said guiding means as the same is advanced that only the corners of the substance remote from the axis of rotation of the knife lie without the arcuate path of movement of the knife and remain intact to connect the slices to each other, and means for retaining the slices in upright assembled position after they have been formed.

3. In a slicing machine, the combination of a rotatable knife support having an extension, a rotatable knife mounted on the extension, means for rotating said support and said knife whereby said knife is given arcuate and rotative movement, a substance support mounted substantially tangential to the arcuate path of the knife with the center line of the substance support at right angles to the plane of the path of movement of the knife and with the outer edges of the substance support lying outside said path, means including an eccentric mounted on the knife support for bodily adjusting the knife toward and from the substance support, and relative to the knife support, for varying the arcuate path of the knife to vary the depth of the cut in the substance upon the substance support, drive means to effect rotation of the knife in any of its adjusted positions whereby a substance moved along said support past the cutting plane of said knife would receive transverse cuts which extend substantially through the substance from one side thereof to the other, thereby leaving slices which are connected together only at the adjacent corners of the substance which passes the cutting plane of the knife outside of the path of movement of said knife.

4. In a slicing machine, the combination of a substance support for the substance to be sliced, a rotatable knife support having an extension, a rotatable knife mounted on said extension for arcuate and for rotative movement, driving means including an endless member for rotating said knife, means including an eccentric for bodily adjusting the knife toward and away from the substance support for limiting the depth of the cut in the substance on the support, and independent means for adjusting the tension of the endless member, said substance support being positioned horizontally below the knife so that its central longitudinal line is at right angles to the plane of rotation of the knife and in vertical alignment with the lowest point of the arcuate path of the knife and having the outer edges of the surface of the support lying outside said path.

5. In a slicing machine, the combination of a substance support for the substance to be sliced, a rotatable knife support having an extension, a rotatable knife mounted on said extension for arcuate and for rotative movement, driving means including an endless member for rotating said knife, means including an eccentric for bodily adjusting the knife toward and away from the substance support for limiting the depth of the cut in the substance on the support, and independent means for adjusting the tension of the endless member, said substance support being positioned with its central longitudinal line parallel to the axis of rotation of the knife support and having the opposite longitudinal side edges of the substance support equidistant from said axis.

WILLIAM MAHLER.